March 28, 1950     M. P. STEWART     2,502,287
GARMENT MEASURING AND BASTING DEVICE
Filed June 15, 1946
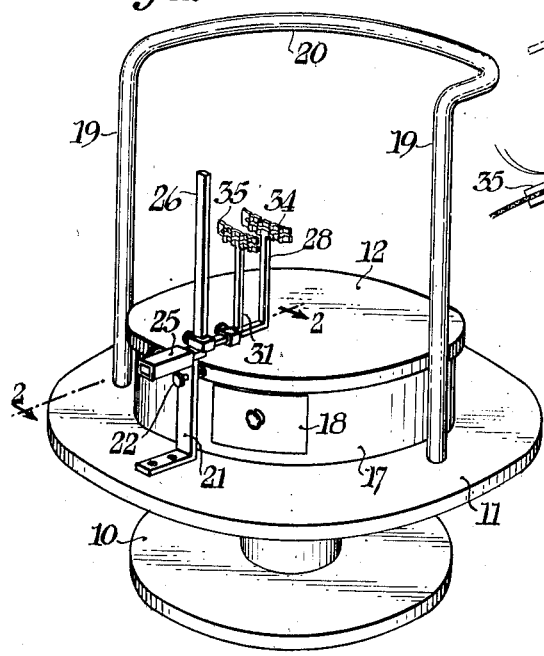
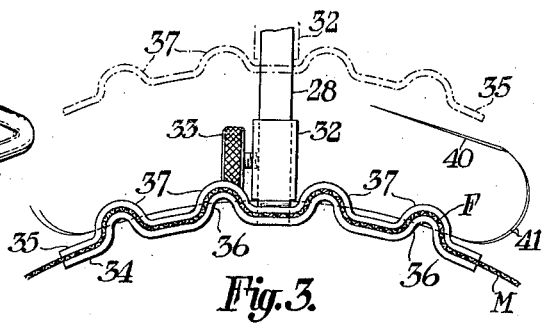
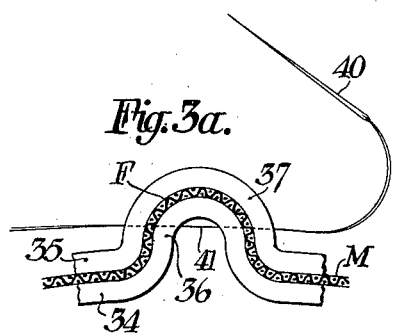
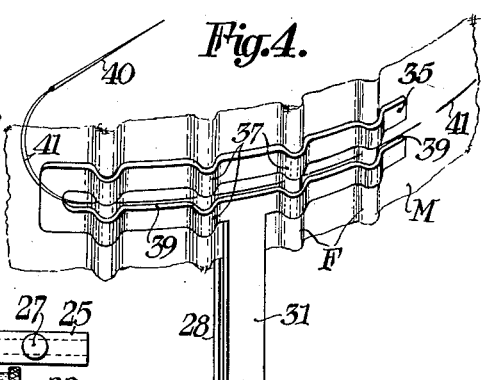
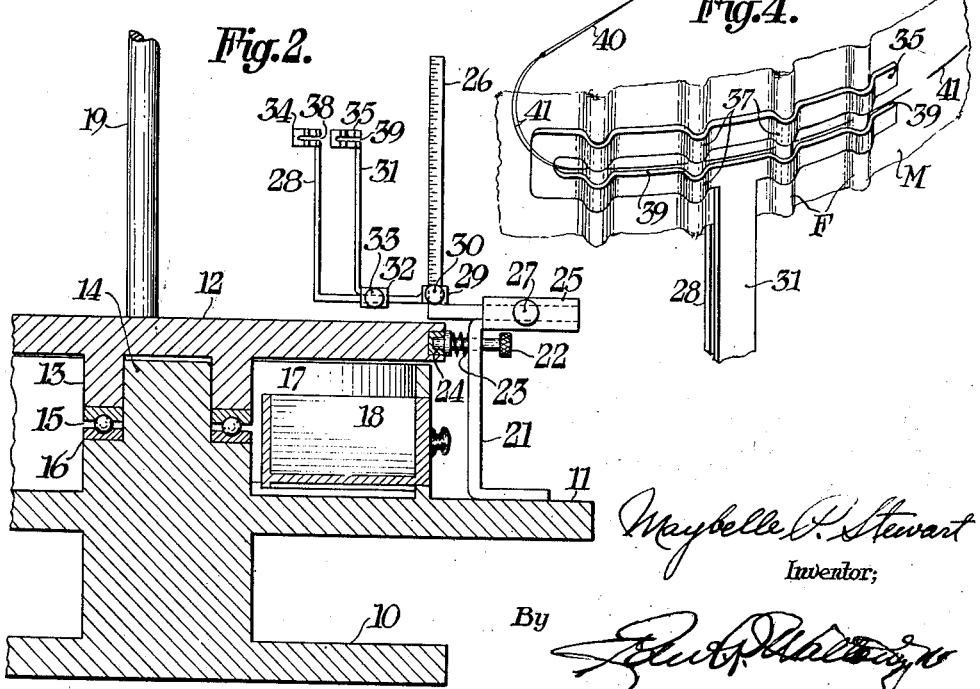
Maybelle P. Stewart
Inventor;
By
Attorney.

Patented Mar. 28, 1950

2,502,287

UNITED STATES PATENT OFFICE 2,502,287

GARMENT MEASURING AND BASTING DEVICE

Maybelle P. Stewart, Tiffin, Ohio

Application June 15, 1946, Serial No. 677,038

3 Claims. (Cl. 33—10)

This invention relates to measuring and marking devices and more particularly to that type of device especially adapted for measuring and marking skirt hems.

Many devices of this type have been developed especially for use by dressmakers for facilitating the even marking of the hem line of a skirt. These devices usually include a measuring means with which to measure the distance of the hem line from the floor or ground level and a marking means for marking the hem line at the desired level. The prior art marking devices are adapted for use with chalk in either stick or powder form, pins, staples or other suitable materials for marking the hem line directly on the skirt. After the hem line is marked on the skirt, the dressmaker or seamstress then bastes along the marked line to form a continuous non-erasable line for use in forming the hem of the skirt. Thus two more or less duplicating operations are required, that of marking the hem line and, second, that of basting it in. Furthermore, the majority of these devices are for use on the floor which requires a dressmaker or fitter to stoop or squat, or even sit on the floor, to properly use the devices. This is not only inconvenient to the fitter but is also hard on her clothing and altogether distasteful to her. Although there are some dressmaker's stands disclosed among the prior art devices, they have not been completely satisfactory in their convenience to the fitter or dressmaker, in their safety or security to the person being fitted, or in their primary function of facilitating the fitting operation.

Having in mind the defects of the prior art methods and apparatus, it is an object of this invention to provide an arrangement for marking a hem line by basting, in the first place, and thereby eliminating one step in the operation of hemming a skirt. It is contemplated that the device should accommodate the basting of a plurality of evenly spaced stitches in the same operation and that the person on whom the garment is being fitted may be pivotally supported at an elevation to facilitate the rapid repeating of the basting steps about the circumference of the skirt, without movement by the person and at a convenient working level for the operator. It is desirable that the apparatus be economical in construction with simplicity and ease of operation.

The foregoing objects and others ancillary thereto are preferably accomplished, according to a preferred embodiment of the invention, by providing a basting and measuring device in operative relation with an elevated, pivotally supported turntable. Specifically, the measuring and basting device is mounted on the first and stationary level of a stepped pedestal, the second and upper level of which is pivotally supported. The stationary first level is incorporated with the base of the pedestal upon which the second level is pivotally mounted. The measuring and marking device is mounted on the first level adjacent the periphery of the pivotal second level and is supported at the elevation of the second level. The wearer of the garment which is to be measured, steps up onto the pivotal turntable whereupon the seamstress can measure and baste the hem line in the garment by gradually pivoting the turntable. By this arrangement, the wearer does not have to move or change her position so that an even hem line is assured. For purposes of safety and the feeling of security, a handrail is supported by the stationary first level of the pedestal for the convenience of the wearer, and means are provided for latching the pivotal turntable in a stationary position while the wearer ascends or descends.

The measuring and basting device comprises a vertical measuring stick that is slidingly mounted for movement radially of the pedestal. An L-shaped bar is slidingly mounted on the measuring stick for vertical movement by means of a collar and set screw fixed to the end of the horiontal arm of the bar. A vertical bar, corresponding in height with the vertical arm of the L bar is slidingly supported on the horizontal arm of the L bar. Two concentric arcuate members are supported respectively by the upper ends of the vertical bar and the vertical arm of the L bar. These arcuate members are in the form of horizontal strips having coinciding slots which are open at one end and run substantially the full length of the members. The arcuate members have a plurality of interfitting grooves or ridges spaced along their length and formed transverse thereto. Thus, when the wearer has mounted the pedestal the near edge of the garment is placed between the arcuate members which are positioned at the desired height by movement of the L bar sleeve up the measuring stick, the vertical bar then being moved toward the vertical arm to clamp the material of the garment between the arcuate members. The interfitting grooves or ridges in the arcuate members form spaced folds in the material so that the seamstress may run her needle and basting thread along the slots in the arcuate members and through the folds so that in one operation the seamstress may, at a measured level, baste in a plurality of evenly spaced and perfectly aligned stitches around several inches of the garment. The vertical bar may then be withdrawn to release the material whereupon the seamstress unlatches and pivots the turntable, with the wearer thereon, the distance of the basting just performed. This operation is repeated until the complete hem line is basted. It will be understood that the basted portion of the garment may be moved relative to the arcuate members because their slots, through which the basting is made, are open at the end facing the basted part of the garment so that the basting thread may be readily moved along through and out of the slots.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout, and in which:

Fig. 1 is a view in perspective of the apparatus;

Fig. 2 is a fragmentary cross sectional view taken on line 2—2 of Fig. 1;

Fig. 3 is a top plan view of the arcuate clamping members;

Fig. 3a is an enlarged fragmentary top plan view of the arcuate clamping members; and Fig. 4 is a view in perspective of the arcuate clamping members in clamping position.

A dressmaker's stand to overcome the defects hereinbefore enumerated should have the totally distinct characteristics of facilitating the measuring, marking and basting of a hem line or the like in one operation and in accommodating the performance of this operation with ease and convenience for the fitter but with safety and security for the person being fitted and without requiring movement of the person so that an accurate hem line is assured. Accordingly, a preferred embodiment of the invention, referring to Figs. 1 and 2 of the drawing, is constituted by a pedestal 10 including an elevated flange or step portion 11 and supporting a turntable 12 that is stepped at a second level. The turntable 12 is provided with a downwardly turned axial flange 13 which surrounds a central spindle 14 and is supported by the pedestal 10 and is supported for free rotation by an anti-friction bearing 15 mounted on a shoulder 16 of said pedestal 10.

An upstanding wall 17 is supported by the pedestal 10 to enclose the area between the step flange 11 and the turntable 12 and to house a drawer 18 for the convenient storage of needles, thread and the like. Posts 19, supporting a handrail 20, are mounted on the step flange 11 to assist a person ascending to or descending from the turntable 12. A bracket 21 is mounted on the step flange 11 and has an aperture therein to receive a pin 22 that is resiliently urged by a spring 23 against the periphery of the turntable 12. A socket 24 is located in the periphery of the turntable 12 to receive the end of the pin 22 and hold the turntable stationary while a person is stepping to or from said turntable.

The bracket 21 also supports a horizontal sleeve 25 adapted to slidably receive the horizontal arm of a measuring stick 26 which may be clamped in position by a thumbscrew 27. The measuring stick 26 is thereby afforded radial adjustment. An L-shaped bar 28 is supported by a collar 29, affixed to its horizontal arm, which is slidably mounted on the vertical arm of the measuring stick 26 and may be clamped in position by a thumbscrew 30. A vertical bar 31 is supported by a sleeve 32 that is slidably mounted on the horizontal arm of the L-shaped bar 28 and that may be clamped in position by a thumbscrew 33. Measuring and marking devices 34 and 35 are respectively supported at the upper ends of the vertical arm of the L-bar 28 and the vertical bar 31.

The marking devices 34 and 35 are arcuate in shape, as best shown in Figs. 3 and 4, and are concentric so that they may fit snugly together to form clamps. Each of the devices or clamps 34 and 35 is provided with a plurality of spaced, transverse grooves or ridges 36 and 37 which are U-shaped so that ridges of 36 may fit within the grooves of 37. The clamps 34 and 35 are adapted to receive and hold a sheet of material, such as cloth, therebetween so that the grooves or ridges 36 and 37 form spaced folds in the cloth. As best shown in Fig. 4, the clamps 34 and 25 are provided with slots 38 and 39 which are open at one end and which extend substantially the full length of the clamps. Thus, when the clamps 34 and 35 have material clamped therebetween, a needle 40 and basting thread 41 may be easily passed along or within the confines of the slots 38 and 39 and through the folds of the material formed by the grooves 36 and 37. The clamps 34 and 35 are several inches in length so that a substantial section of the garment may be basted at one setting.

To review the operation of the apparatus, it will be understood that the wearer of the garment to be measured mounts the stationary step 11 and then the turntable 12 while it is held stationary by the pin 22 being seated in the socket 24. The posts 19 and handrail 20 are available for the convenience and security of the wearer while stepping up to the turntable 12. The wearer then assumes a normal posture and the fitter slides the near edge of the garment down between the clamps 34 and 35, which at this time are spaced apart. The clamps 34 and 35, if not previously set, may then be adjusted vertically so that their corresponding or coinciding slots 38 and 39 are at the proper level.

This adjustment is effected by sliding the collar 29 to the proper position on the vertical arm, which is suitably calibrated, of the measuring stick 26, the collar 29 then being clamped by tightening the thumbscrews 30. The calibrations of the measuring stick 26 may be such as to accommodate the height of the slots 38 and 39 relative to the collar 29 and of said collar relative to the surface of the turntable 12. When they are positioned at the desired height, the clamps 34 and 35 may then be closed by sliding the sleeve 32 along the horizontal arm of the L-bar 28 and clamping the sleeve 32 by the thumbscrew 33. If it is necessary to adjust the clamps 34 and 35 toward or away from the wearer, the measuring stick 26 may be adjusted relative to its supporting sleeve 25 and clamped by the thumbscrew 27.

The device is then in proper position for the basting operation. The fitter may take the needle 40 and basting thread 41, which may have been conveniently stored in the drawer 18, and pass the needle 40 along and within the slots 38 and 39 and through the folds formed in the garment material by the grooves 36 and 37. The clamps 34 and 35 are preferably as long as can be conveniently employed so that several inches of the garment may be basted in this manner at one setting. The clamps 34 and 35 may then be spaced slightly, the fitter withdrawing the pin 22 from the socket 24 and turning the table 12 the distance of the garment that has just been basted. The clamps 34 and 35 may then be closed again and the basting operation performed around several inches more of the circumference of the garment.

As best shown in Fig. 4, the slots 38 and 39 are preferably open at the leading ends of the clamps 34 and 35 so that the basted material may be moved relative thereto to pass the basting thread 41 into and along the length of the slots 38 and 39 to the closed ends thereof, and thereby be in proper position for the next basting operation. It is obvious that, if desired, the open ends of the slots 38 and 39, or the basting stitches may be reversed in direction so that the basting is sewed from the open ends toward the closed ends of the slots 38 and 39. When the device is employed in this manner, the basted portion of the garment and the needle end of the thread may be moved from between the clamps 34 and 35 so that the thread is moved from adjacent the closed ends of the slots to a point beyond the open ends thereof. In this position the clamps 34 and 35 may be reclosed and the fitter can sew through the folds of the material to the closed ends of the slots 38 and 39. One or the other of the above described operations is repeated until the entire circumference of the garment has been marked by basting. Thus, the marking and the basting of the garment is effected in a single operation. When the garment is completely basted, the turntable will have been moved one complete revolution so that the pin 22 will again be seated in the socket 24 to hold the turntable 12 stationary while the wearer descends therefrom.

By the use of the present apparatus, a fitter or seamstress may accurately mark by basting the hem line of a garment with ease and convenience due to the height and rotatability of the table 12 while simultaneously offering safety and security to the wearer of the garment by means of the handrail 20 with which to steady themselves while being turned, and the latching pin 22 for holding the turntable 12 stationary during the ascent or descent of the wearer. Furthermore, the apparatus facilitates the basting of the hem line in the first place, thereby eliminating the usual step of marking the hemline and also precluding the soiling by chalk or tearing by staples or pins, and also eliminating the step of removing the marking means such as chalk lines, staples, pins or the like after the usual basting step. While the apparatus will find its greatest utility in the marking by basting of hem lines in skirts, it is obvious that it may be readily employed or adapted, within the inventive concept, for measuring and basting all types of hem lines that may be employed in any type of garment.

Although certain specific embodiments of the invention have been shown and described, it is obvious that many modifications thereof are possible. The invention, therefore, is not to be restricted except as is necessitated by the prior art and by the spirit of the appended claims.

That which is claimed, as new, is:

1. A garment height measuring device, including, in combination, a bracket, a horizontal sleeve supported on the bracket, an upright measuring stick having a horizontal foot disposed in said sleeve and horizontally slidable therein, a fastener adjustably mounted on said sleeve and adapted to be engaged with said stick foot to lock the stick to said sleeve in horizontally adjusted position, an angular arm having a base portion mounted for vertical adjustment on said stick, a fastener mounted on said arm base portion and adapted to be engaged with said stick to lock said arm to said stick in vertically adjusted elevation thereon, said arm also having an upwardly extending part, a garment height indicating element on the upper end of said upwardly extending arm part, a second upright arm mounted at its lower end and on the base part of said other arm and horizontally slidable thereon, and a second garment-height measuring element on the upper end of the second upright arm, said garment-height measuring elements being disposed horizontally at the same height and adapted to receive the lower edge portion of a garment between them, said measuring elements being complementary and each being longitudinally arcuate in shape and formed with complementary vertical ridges and grooves adapted to form the garment material into vertical folds when the measuring elements are brought against the material from opposite sides, and registering slots longitudinally in said elements and extending transversely through said ridges and grooves to expose the folds of garment material and render them accessible for basting, said slots opening through the corresponding end of each element to permit removal of the elements from the material after the basting operation.

2. A garment measuring apparatus of the character described, including, in combination a pedestal having a step, a rotary turntable thereon above said step, an upright bracket supported on said step, a horizontal sleeve supported on the bracket above the height of the turntable, an upright stick having a horizontal foot disposed in said sleeve and horizontally adjustable therein, a fastener adjustably mounted on said sleeve and adapted to be engaged with said stick foot to lock the stick to said sleeve in horizontally adjusted position, an angular arm disposed over the turntable and having a base portion mounted for vertical adjustment on said stick, a fastener mounted on said arm base portion and adapted to be engaged with said stick to lock said arm to said stick in vertically adjusted elevation thereon, said arm also having an upwardly extending part, a garment height indicating element on the upper end of said upwardly extending arm part, a spring detent mounted on said upright bracket in alignment with and biased toward the periphery of the turntable, and a recess in the periphery of the turntable to receive said detent to restrain the turntable from rotating.

3. In a basting device of the type described, a standard, a pair of clamp members mounted for adjustment along said standard and oppositely disposed and relatively movable to receive and to releasably hold the portion of a fabric material therebetween to be basted, said members being complementary and each being formed with complementary substantially parallel ridges and grooves adapted to cooperate to form said material into folds, when the members are brought against said material from opposite sides, said clamp members having registering elongated slots therein and extending transversely through said ridges and grooves to expose the folds of said material and render them accessible for basting, said slots opening through one corresponding end of each clamp member to permit a basted portion of said material together with an unused portion of a basting thread to be shifted from between said clamps and, thereafter, permitting the continuance of said basting operation repeatedly and progressively upon adjacent clamped portions of said material with the same thread.

MAYBELLE P. STEWART.

REFERENCES CITED

The following references are of record in the file of this patent:

UNITED STATES PATENTS

| Number | Name | Date |
|---|---|---|
| 790,687 | Johnson | May 23, 1905 |
| 846,149 | Scully | Mar. 5, 1907 |
| 909,258 | Thies | Jan. 12, 1909 |
| 930,559 | Newman | Aug. 10, 1909 |
| 975,724 | Shaiffer | Nov. 15, 1910 |
| 1,318,474 | Barceloux | Oct. 14, 1919 |
| 1,616,046 | Hobbs | Feb. 1, 1927 |
| 2,194,803 | Lucas | Mar. 26, 1940 |
| 2,446,319 | Orthwin | Aug. 3, 1948 |

FOREIGN PATENTS

| Number | Country | Date |
|---|---|---|
| 548,660 | Great Britain | Oct. 20, 1942 |